March 25, 1969 R. S. DEGENKOLB ET AL 3,434,877

METALLIC CONNECTION AND THE METHOD OF MAKING SAME

Filed July 16, 1965

INVENTORS
ROBERT S. DEGENKOLB &
WILLIAM H. LIEDERBACH

BY W. S. Hill
AGENT 3,434,877

METALLIC CONNECTION AND THE METHOD OF MAKING SAME

Robert S. Degenkolb, Oaklandon, and William H. Liederbach, Carmel, Ind., assignors to Radio Corporation of America, a corporation of Delaware Filed July 16, 1965, Ser. No. 472,502
Int. Cl. B44d *1/18;* C03c *25/02*
U.S. Cl. 117—212 12 Claims This invention relates generally to electrically conducting films and particularly to improved connecting means for electronic circuit components in the thin film form, whereby at least one of the components is a cermet resistor. Cermet resistors are made of resistance material comprising a ceramic-type binder, such as glass or vitreous enamel frit, having finely divided, amorphous particles of metal dispersed throughout the binder.

A thin film of silver paste has been used as contact means for thin film cermet resistors. However, the contact interface between the silver and the cermet is unreliable. Close examination shows the contact surface to have a spider web configuration.

The prior art shows an expensive solution of this problem, viz., a gold-platinum alloy used instead of the silver.

An object of the present invention is to provide improved reliable interconnections for thin film cermet resistors.

Another object is to provide thin film connecting means with excellent solder wetting.

Still another object is to provide a low-cost alloy for thin film cermet resistor interconnections.

The foregoing objects are achieved by providing an electrically conducting film prepared by depositing a palladium-silver alloy film on a ceramic substrate, which is also the substrate for the cermet resistor. The resistor and the alloy film overlap each other.

Figure 1:
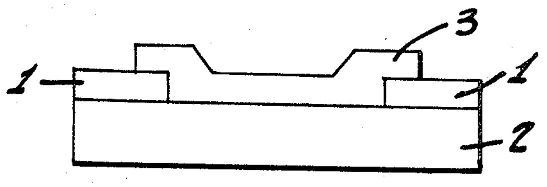
Figure 2:
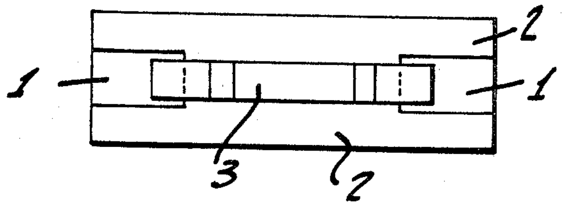

FIGURE 1 is a side view, greatly enlarged, of a cermet resistor with improved metalized terminations deposited on a substrate in accordance with the present invention; and FIGURE 2 is a plan view of the same device as shown in FIGURE 1.

It has now been found that the problem of unreliable contact interfaces between a silver connecting film and a cermet resistor can be solved by adding palladium to the previously used silver paste compositions. By using palladium-silver alloy as a connecting film, the contact interface is of a dense and uniform structure, and a reliable connection is provided.

In the structure of FIGURES 1 and 2, the connection composition 1 is applied in a uniform thickness and desired shape on a ceramic base 2. Then the ceramic substrate 2 with the applied conductive material 1 is subjected to air-drying. Next, cermet resistor paste 3 is applied to the substrate 2 in film form such that it partly overlaps the connection film. Finally, the substrate 2 with the connection film 1 and the cermet resistor 3 is heated and fired.

The conductive material 1 comprises a finely divided mixture of palladium, silver, glass, and $Bi_2O_3$, in suitable proportions. This composition may be dispersed in a conventional organic vehicle dissolved in an organic solvent to form a paste suitable for application by any of the usual methods, as by brush, spray, squeegee, or stencil-screen process.

The silver and palladium may be applied in any convenient form, preferably in powder form, or as silver resinate and palladium resinate. When the resinates are used, glass and $Bi_2O_3$ are not needed.

The glass and $Bi_2O_3$ are used as a flux so that after the firing step the metals are bound strongly to the ceramic substrate by the glass and $Bi_2O_3$. A preferred glass is borosilicate glass.

The organic vehicle, exclusive of solvent, may be composed of 1–5 percent by weight of a viscosifier and 95–99 percent by weight of hydrogenated rosin. Examples of hydrogenated rosin are glycerol ester of hydrogenated rosin or hydrogenated esters of rosin. The rosin should be one which volatilizes easily during the heating step. The viscosifier may be a cellulosic material, preferably ethylcellulose having an ethoxyl content of about 44 to 49 percent by weight, or nitro-cellulose.

As a solvent an organic solvent may be used, preferably butyl Carbitol acetate, butyl Cellosolve acetate, or ethylene glycol monethyl ether.

The organic vehicle comprise about 15 to 25% by weight of the undried film and the organic solvent may comprise about 5 to 10 percent by weight of this film.

As above stated, the connection composition 1 is applied to a ceramic base 2. This may be done by any of the application methods above disclosed.

The ceramic dielectric base material may comprise a ceramic material that can withstand the firing temperature of the composition. For example, porcelain, barium titanate, metal carbides, or the like, may be used.

The ceramic substrate 2 to which the conductive material 1 is applied is then subjected to air drying at about 25°–30° C., or oven drying at about 75° to 150° C.

Then the cermet resistor paste 3 is applied to the substrate 2 in the above-described manner. The substrate 2 now is set in lint-free atmosphere for about 10 to 20 minutes, after which it is heated at about 100° to 150° C. During this heating step, which preferably takes place for about 15 minutes to 1 hour, the volatilizable substances, mainly the solvent, are driven off. At the end of this heating step, the substrate is fired for about ½ to 4 minutes at a peak temperature of about 725° to 760° C. to alloy the silver and palladium. The firing is done in a continuous belt furnace with carefully controlled time-temperature profile. The total cycle from room temperature to peak temperature and back to room temperature is 30–60 minutes.

The following examples are given to illustrate certain details of the invention, it being understood that the details of the examples are not to be taken as in any way limiting the invention thereto. In the examples, percentages are by weight.

EXAMPLE I

A mix containing by weight 15.68% palladium powder, 41.55% silver powder, 2.35% lead borosilicate glass powder, 11.70% bismuth trioxide, 16% glycerol ester of hydrogenated rosin, 2% nitrocellulose, and 10.72% butyl Carbitol acetate is blended on a 3-roll paint mlil. The palladium and silver powder have an average particle size of 2 to 5 microns. This paste is stencil-screened with a thickness of about 2 mils on a porcelain substrate. The substrate, with the screned-on conductive material, is oven dried at about 100°–150° C. Then the cermet resistor paste is applied with about the same thickness as the connecting material. Now the substrate is let set in lint-free atmosphere for 15 minutes, and then heated in a continuous belt furnace for about 50 minutes, reaching a peak temperature of about 750° C. After being cooled down naturally the device is ready for use.

EXAMPLE II

A paste is prepared, as in Example I, containing 15.5% palladium, 38.75% silver, 6.75% zinc borosilicate glass, 9.5% bismuth trioxide, 16% hydrogenated ester of rosin, 2% ethyl cellulose with an ethoxyl content of about 44% to 49%, and 11.5% butyl Cellosolve acetate. The materials are deposited as in Example I.

Since the compositions herein disclosed may be varied considerably without departing from the spirit and scope of the invention, it is to be understood that the invention is not limited by the specific illustrations given above. The compositional range by weight is:

| | Percent |
|---|---|
| Palladium | 13–25 |
| Silver | 13–42 |
| Glass | 2–6 |
| $Bi_2O_3$ | 6–12 |
| Organic vehicle | 15–46 |
| Solvent | 5–10 |

In these compositions, the silver and palladium may be present in the ratio of about 3:1 to 1:1 by weight and the glass and bismuth oxide are present in the ratio of 1:1 to 1:6 by weight. In the fired film, the glass-like cement is present in an amount of about 10% to 30% by weight and the alloy comprises about 70 to 90% by weight.

EXAMPLE III

In this example the silver and palladium are applied as resinates, whereby a very intensive mixing is assured. Furthemore, the metallo-organic resinates of silver and palladium contribute to much lower material cost. The silver resinate of this example contains 22.5% Ag, whereas the palladium resinate contains 9% Pd. When using the metallo-organic resinate for the mixture, preferably the proportion of palladium to silver is 1 weight part palladium to 2.5 weight parts of silver, that means 50% silver resinate and 50% palladium resinate by weight. However, the ratio of palladium to silver may be between 1 to 1 and 1 to 3.

When the resinates are purchased as commercial products, they are usually in solution in mixtures of essential oil and may contain minor amounts of other ingredients in addition to the primary metal resinate specified. For example, silver resinate, as purchased, usually contains about 0.15% by weight rhodium resinate in order to give the material better coherence as a film. It also may contain about 0.5–2% by weight bismuth resinate.

The resinate products of this example are physically in the form of pastes. A paste is prepared which is a mixture of 50% by weight of the silver resinate product and 50% by weight of the palladium resinate product. This paste is applied to a ceramic substrate containing about 65–99% aluminum oxide and cermet resistor paste is then applied so that it overlaps the resinate paste. Drying and firing are the same as in Example I.

The material herein disclosed has a number of advantages over that of the prior art:

The material is available at a much lower cost than the gold-platinum alloy previously used as a connecting means for cermet resistors.

The solder wetting is excellent.

The conductivity of the palladium-silver alloy is better than that of the gold-platinum alloy, whereby a lower resistance is introduced into the circuit.

The adherence to the ceramic substrate is better than that of the gold-platinum alloy, thereby providing less product rejection during manufacturing.

What is claimed is:

1. Electronic apparatus comprising a ceramic substrate member having deposited on a surface thereof electronic circuit components in thin film form, said components including at least one cermet resistor and connecting means therefor, said connecting means comprising an electrically conducting film comprising silver and palladium in the ratio between about 3:1 to 1:1 by weight.

2. An article for use as connecting means for electronic circuit components in thin film form, said components including at least one cermet resistor, said article film comprising a ceramic substrate having thereon an electrically conducting film, about 10 to 30 percent by weight of glass-like cement and about 70 to 90 percent by weight of an alloy, said alloy being composed of silver and palladium in the ratio between about 3:1 to 1:1 by weight.

3. An article as defined in claim 2, wherein said glass-like cement is composed of glass and $Bi_2O_3$ in the ratio between about 1:1 to 1:6 by weight.

4. An article as defined in claim 2, wherein said glass-like cement is composed of borosilicate glass and $Bi_2O_3$ in the ratio between about 1:1 to 1:6 by weight.

5. In a method of making an electronic circuit the steps of applying to a ceramic substrate a film composed of a mixture of (a) 13 to 25 percent by weight of palladium, (b) 13 to 42 percent by weight of silver, (c) 2 to 6 percent by weight of glass, (d) 6 to 12 percent by weight of $Bi_2O_3$, (e) 15 to 46 percent by weight of an organic vehicle, and (f) 5–10 percent by weight of an organic solvent, applying said mixture in any desired shape and film form on a ceramic substrate member, drying said film, depositing on said substrate a cermet resistor in film form such that said resistor overlaps said first mentioned film, again drying said substrate and said films, and firing said substrate and said films to drive off all volatilizable substances in said films and to alloy said sliver and palladium.

6. A method according to claim 5, wherein said palladium and said silver are applied in powder form.

7. A method according to claim 5, wherein said palladium and said sliver are present in a ratio of about 1 to 2.5.

8. A method according to claim 5, wherein said glass is borosilicate glass.

9. A method according to claim 5, wherein said organic vehicle, exclusive of solvent, is composed of 1–5 percent by weight of a viscosifier, the balance of said organic vehicle being hydrogenated rosin, said viscosifier being composed of ethyl cellulose and having an ethoxyl content of about 44 to 49 percent by weight.

10. A method according to claim 9, wherein said viscosifier is nitro cellulose.

11. A method according to claim 5, wherein said firing is accomplished at about 725–760° C. for about ½ to 4 minutes in a cycle of 30–60 minutes from room temperature to peak temperature and back to room temperature.

12. In a method of making an electronic circuit the steps of applying to a ceramic substrate a paste composed principally of silver resinate and palladium resinate wherein the ratio of silver to palladium is between about 3 to 1 and 1 to 1, and also depositing on said substrate a cermet resistor in film form such that said resistor overlaps said first mentioned film, and heating said substrate and said films to drive off all volatilizable substances in said films and to alloy said silver and said palladium.

References Cited

UNITED STATES PATENTS

| | | | |
|---|---|---|---|
| 2,924,540 | 2/1960 | D'Andrea | 117—227 |
| 3,189,482 | 6/1965 | Bajars et al. | 252—514 X |
| 3,232,886 | 2/1966 | Hoffman | 252—514 |
| 3,252,831 | 5/1966 | Ragan | 252—514 XR |
| 3,308,528 | 3/1967 | Bullard et al. | 338—309 XR |
| 3,347,799 | 10/1967 | Wagner | 252—514 |
| 3,374,110 | 3/1968 | Miller | 117—227 X |

WILLIAM L. JARVIS, *Primary Examiner.*

U.S. Cl. X.R.

117—227, 121, 123; 338—309; 252—514; 106—1